UNITED STATES PATENT OFFICE.

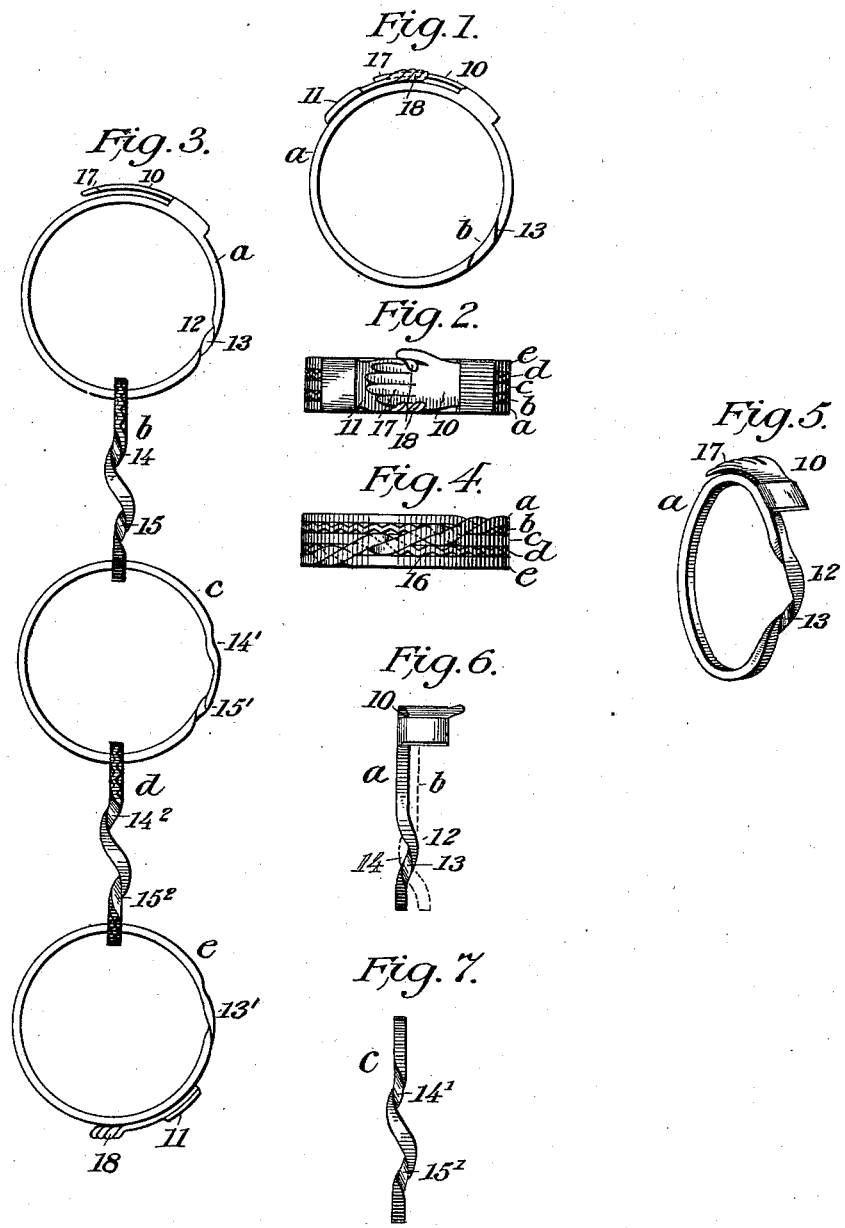

JOSEPH SAVA, OF WASHINGTON, DISTRICT OF COLUMBIA.

FINGER-RING.

SPECIFICATION forming part of Letters Patent No. 685,947, dated November 5, 1901.

Application filed July 9, 1901. Serial No. 67,619. (Model.)

*To all whom it may concern:*

Be it known that I, JOSEPH SAVA, a subject of the King of Italy, residing at Washington, in the District of Columbia, have invented a new and useful Improvement in Finger-Rings, of which the following is a specification.

This invention relates to improvements in finger-rings, and more especially to the class known as "wedding-rings;" and the object is to provide a ring ornamental in appearance, novel in construction, and so built up of a series of links as to form a broad band with a crest which constitutes a clasp portion.

A further object is to provide such a ring by employing a series of links which are so woven together as to form a smooth band of the desired width, the separate links being closely interwoven by the arrangement of the curves and channels in said separate links.

A still further object is to provide a finger-ring having a slide portion and a clasp portion which when united will present the appearance of two clasped hands.

These objects I attain by constructing a ring in accordance with the accompanying drawings, in which—

Figure 1 is a side view of my ring with all the link members united, showing the smooth circular outlines. Fig. 2 is a top plan view of same. Fig. 3 is a view of the device when the clasps have been disengaged and the link members extended to form a chain or fob. Fig. 4 is an inverted plan view of the completed ring, showing how the link members are interwoven. Fig. 5 is a detail view in perspective of one of the outer link members. Fig. 6 is an edge view of same, showing more clearly the curved channel portion and indicating by dotted lines how the next link member is fitted in place. Fig. 7 is an edge view of one of the intermediate link members.

Similar characters of reference indicate similar parts throughout the several views.

The ring, as shown in Figs. 1, 2, and 4, is composed of a series of link members $a\ b\ c\ d\ e$, each member being circular in form and so linked together as to form when unclasped a chain or fob, as shown in Fig. 3. The link $a$ is provided with an overlapping slide portion 10, which is wide enough to extend over the remaining link members, and this overlapping slide portion 10 is formed integrally with the link member $a$ and is preferably so designed as to represent a human hand with extended fingers, which when the links are assembled rests in a clasp portion 11, formed on the link member $e$, as shown in Fig. 2. Member $a$ is further provided, as at 12, with a curved channel 13, which fits snugly in the curved channel 14 of the member $b$, as shown by the dotted lines of Fig. 6, and in said member $b$, adjacent to channel 14, is formed a similar channel 15 to receive the next intermediate member $c$. Member $c$ is provided with channels 14' 15', and the member $d$ has channels $14^2\ 15^2$, which in structural formation are identical with channels 14 15 in member $b$, already described. The link member $e$ is provided with a curved channel 13', similar to channel 13 in link member $a$, which fits around the curved channel portion $15^2$ of member $d$, and by means of these curves and channels a series of locking recesses are formed for securing all the link members where they are interwoven when formed into a ring, as shown at 16 in Fig. 4. The slide portion 10 on link $a$ is shown as representing a human hand with extended fingers 17, which are designed to slide over the clasp portion 11 of link $e$, where it is held in place from lateral movement by the thumb and finger projections 18.

In constructing this ring I have formed it of five link members, all united, as shown—two outer members, provided with interlocking clasp and slide portions, and three intermediate members—all of which have curved channels formed therein, so they may be closely interwoven and locked in position.

It is obvious that a greater number of links may be used in constructing this ring and that the slide and clasp portions may be modified as to design and ornamentation; but I prefer to construct it as illustrated.

Having thus fully described my invention, what I claim, and desire to secure by Letters Patent, is—

1. A finger-ring comprising outer link members, provided with slide and clasp portions, and intermediate links having curved channel portions, substantially as and for the purposes specified.

2. In a finger-ring, a series of interwoven link members provided with curved channels, the two outer members being provided with crest, which constitutes a clasp portion, substantially as specified.

3. A finger-ring composed of three or more link members loosely interwoven and interlocked so as to form a chain or fob when disengaged, and complemental clasp portions on the outer link members, substantially as specified.

In testimony whereof I have hereunto set my hand in the presence of two subscribing witnesses.

JOSEPH SAVA.

Witnesses:
CHARLES H. BAKER,
CLIFFORD K. BERRYMAN.